United States Patent [19]

Kamimura

[11] Patent Number: 4,953,890
[45] Date of Patent: Sep. 4, 1990

[54] SUSPENSION APPARATUS OF A VEHICLE

[75] Inventor: Shoichi Kamimura, Hiroshima, Japan

[73] Assignee: Mazda Motor Corporation, Hiroshima, Japan

[21] Appl. No.: 443,477

[22] Filed: Nov. 30, 1989

[30] Foreign Application Priority Data

Nov. 30, 1988 [JP] Japan .................... 63-300858

[51] Int. Cl.[5] ................................ B60G 11/26
[52] U.S. Cl. ..................... 280/707; 364/424.05
[58] Field of Search ................. 280/703, 707; 364/424.05

[56] References Cited

U.S. PATENT DOCUMENTS

| | | | |
|---|---|---|---|
| 4,700,971 | 10/1987 | Doi et al. | 280/707 |
| 4,825,370 | 4/1989 | Kurosawa | 280/707 |
| 4,848,790 | 7/1989 | Fukunaga et al. | 280/707 |
| 4,872,701 | 10/1989 | Akatsu et al. | 280/703 |

*Primary Examiner*—Kenneth R. Rice
*Attorney, Agent, or Firm*—Wegner & Bretschneider

[57] ABSTRACT

An actuator for adjusting a height of the vehicle body is provided for each of the wheels and the height of the body is adjusted for each of the wheels by supplying and discharging an operating fluid to and from the actuator. A vehicle-height detecting sensor is also provided on each wheel for detecting the height of the vehicle body and for control over a posture of the body, namely, control over a supply or discharge of the operating liquid to or from the actuator is implemented with respect to bouncing, pitching or rolling of the body on the basis of output from the vehicle-height detecting sensor. Furthermore, a plurality of vertical G sensors for detecting acceleration in a vertical direction are provided to sense bouncing, pitching and rolling components of acceleration in the vertical direction, and the posture control utilizing the vehicle-height sensor is corrected so as not to make the vertical acceleration for the three components larger. Three vertical G sensors are provided so as to define a virtual plane representing the body, and that, for instance, two of the three vertical G sensors are disposed on the front portion of the body at positions bilaterally symmetrical to each other and one thereof is disposed on the rear portion thereof at a middle position, thereby allowing the three vertical G sensors to enable a detection of the acceleration in the vertical direction with respect to the bouncing, pitching and rolling components.

33 Claims, 7 Drawing Sheets

SUSPENSION APPARATUS OF A VEHICLE

BACKGROUND OF THE INVENTION

1. Field of the Invention

The present invention relates to a suspension apparatus of a vehicle adapted to change suspension characteristics.

2. Description of Related Art

Recently, as a suspension apparatus of a vehicle is called an active suspension, it is proposed that the suspension apparatus is of a type in which its suspension characteristics can be changed in an arbitrary manner. The so-called active suspension is basically constructed such that a cylinder unit is interposed between an unsprung weight and a sprang weight and that the suspension characteristics are controlled by controlling a supply and discharge of operating liquid to and from the cylinder unit. Japanese Patent Publication (Kokoku) No. 14,365/1984 discloses a suspension apparatus which uses a cylinder unit as an actuator for adjusting a height of the vehicle body and which controls a posture of the body by controlling a magnitude of the operating liquid pressures in the cylinder unit.

Such an active suspension as have been disclosed is basically constructed such that a posture of the body is controlled to take a desired posture in terms of bouncing, pitching and rolling, by controlling a height of the body at the positions of the wheels by means of each of the cylinder units.

This posture control can permit a favorable control over a posture of the body itself, however, it might impair ride comfortableness because the vehicle body is pushed up from pavement to a large extent. In order to carry out the posture control without largely impairing ride comfortableness, it may be possible to control acceleration in a vertical direction so as to become as small as possible. Japanese Patent Publication (kokai) No. 139,709/1984 discloses a suspension apparatus in which an air spring is used as an actuator for adjusting a height of the vehicle body and a posture control of the body is carried out while ensuring ride comfortableness, using acceleration in a vertical direction and a differential value of the acceleration in the vertical direction as parameters, while ensuring a ride comfortableness.

SUMMARY OF THE INVENTION

Therefore, the present invention has the first object to provide a suspension apparatus of a vehicle adapted to ensure an optimized control over a ride comfortableness using a vertical G sensor on condition that the suspension apparatus is of a type of a so-called active suspension.

The present invention has the second object to provide a suspension apparatus adapted to lessen the number of the vertical G sensors which are required to sense the acceleration in the vertical direction for each of three posture components including bouncing, pitching and rolling components.

In order to achieve the first object, the present invention involves a suspension apparatus of a vehicle in which control over a posture of the vehicle body is made using acceleration in the vertical direction with respect to each of three posture components including bouncing. pitching and rolling components with the fact taken into account that the posture of the vehicle body can be controlled in three control mode, namely, a bounce control mode for controlling the bouncing component of the posture of the body, a pitch control mode for controlling the pitching component thereof, and a roll control mode for controlling the rolling component thereof.

More specifically, the present invention consists of the suspension apparatus comprising:

a cylinder unit interposed between an unsprung weight and a sprang weight for each of wheels for controlling a height of a vehicle body in accordance with a supply or discharge of an operating fluid comprising an incompressible fluid;

a flow rate control valve for independently controlling a flow rate for supplying or discharging the operating fluid to or from the cylinder unit;

vehicle-height detecting means associated with each of the wheels for detecting a height of the vehicle body;

first control means for controlling the flow rate control valve in response to output from the vehicle-height detecting means so as to allow a posture of the body corresponding to three posture components including bouncing, pitching and rolling components to take a posture satisfying a predetermined condition;

sensor means for detecting acceleration in a vertical direction acting upon the body; and second control means for controlling the flow rate control valve to regulate a displacement movement of the body in response to output from the sensor means;

wherein the sensor means comprises three sensor means, two of which are disposed on a front portion of the body at positions substantially bilaterally symmetrical with respect to a longitudinally central line of the body; and the rest of which is disposed on a rear portion of the body at a position substantially middle in a transverse direction of the body, the three sensor means defining a virtual plane representing the body; and wherein the second control means determines a mode-corresponding control value corresponding to each of three control modes so as to regulate the displacement movement of the body corresponding to the three components of the posture of the body including the bouncing component, the pitching component and the rolling component and determines a control value for the flow rate control valve on the basis of the mode-corresponding control value.

As have been described hereinabove, the suspension apparatus according to the present invention permits control over a posture of the vehicle body corresponding to each of three control modes including a bounce control mode, a pitch control mode and a roll control mode, using acceleration in a vertical direction, thus providing an optimized control over ride comfortableness.

Furthermore, in order to achieve the second object, the present invention consists of the suspension apparatus of a vehicle, in which each of wheels is provided with an actuator for controlling a height of a vehicle body in accordance with a supply or discharge of an operating fluid and the supply or discharge of the operating fluid is controlled in accordance with a predetermined condition;

wherein acceleration in a vertical direction acting upon the vehicle body is used as a control parameter for determining a control value for supplying or discharging the operating fluid; and wherein three sensor means for sensing the acceleration in the vertical direction are provided so as to define a virtual plane extending in a substantially horizontal direction.

As have been described hereinabove, there are provided three vertical G sensors in the present invention although four vertical G sensors are otherwise required in usual cases in order to determine acceleration in a vertical direction corresponding to bouncing, pitching and rolling components. In other words, a disposition of three vertical G sensors so as to define a one virtual plane in a substantially horizontal direction is such that two out of the three vertical G sensors are disposed at positions away from each other in a longitudinal or bilateral direction. The acceleration in the vertical direction corresponding to three modes of control over a posture of the body can be determined by using all the three vertical G sensors with respect to the bounce control mode, by using at least two vertical G sensors disposed at positions away from each other in the longitudinal direction with respect to the pitch control mode, and by using at least two vertical G sensors disposed at positions away from each other in the bilateral direction with respect to the roll control mode.

As rolling occurs on the front wheel side earlier than that on the rear wheel side when a steering wheel is steered, it is preferred that two vertical G sensors are disposed on a front portion of the body at substantially bilateral positions for controlling ride comfortableness by regulating a rolling component of the acceleration in the vertical direction. In this case, the rest one of the three G sensors is preferably disposed on the rear portion of the body at a substantially bilaterally middle position. When the rolling component is controlled for providing ride comfortableness by using the vertical G sensors, it is preferred that control over the rolling component on the rear wheel side is delayed from control over the control of the rolling component on the front wheel side with the fact taken into consideration that there is a delay in responsiveness between occurrence of rolling on the front wheel side and rolling on the rear wheel side.

As an actuator for adjusting a height of the vehicle body, a cylinder unit which uses an incompressible oil solution is used as an operating fluid is preferred from the standpoint of ensuring a sufficient responsiveness and so on.

In order to allow a smooth change in postures of the vehicle body, or heights of the body, it is preferred to control a supply or discharge of the operating fluid to or from the cylinder unit by control over the flow rate. In other words, control over the height of the vehicle body can be made in a smooth way because the operating fluid is fed or discharged to or from the cylinder at a flow rate in accordance with a difference between a current vehicle height and a target vehicle height. If the control of supplying or discharging the operating fluid to or from the cylinder unit is implemented by control over pressures, on the other hand, the operating fluid is supplied or discharged to or from the cylinder unit always at a maximum flow rate.

When the supply or discharge of the operating fluid to or from the cylinder unit is carried out by means of the flow rate control, it is preferred that a control over warping be implemented so as not to cause a large extent of warping between the front and rear portions of the vehicle body.

Other objects, features and advantages of the present invention will become apparent in the course of the description of the preferred embodiments which follows, with reference to the accompanying drawings.

DETAILED DESCRIPTION OF THE PREFERRED EMBODIMENTS

Figure 1:
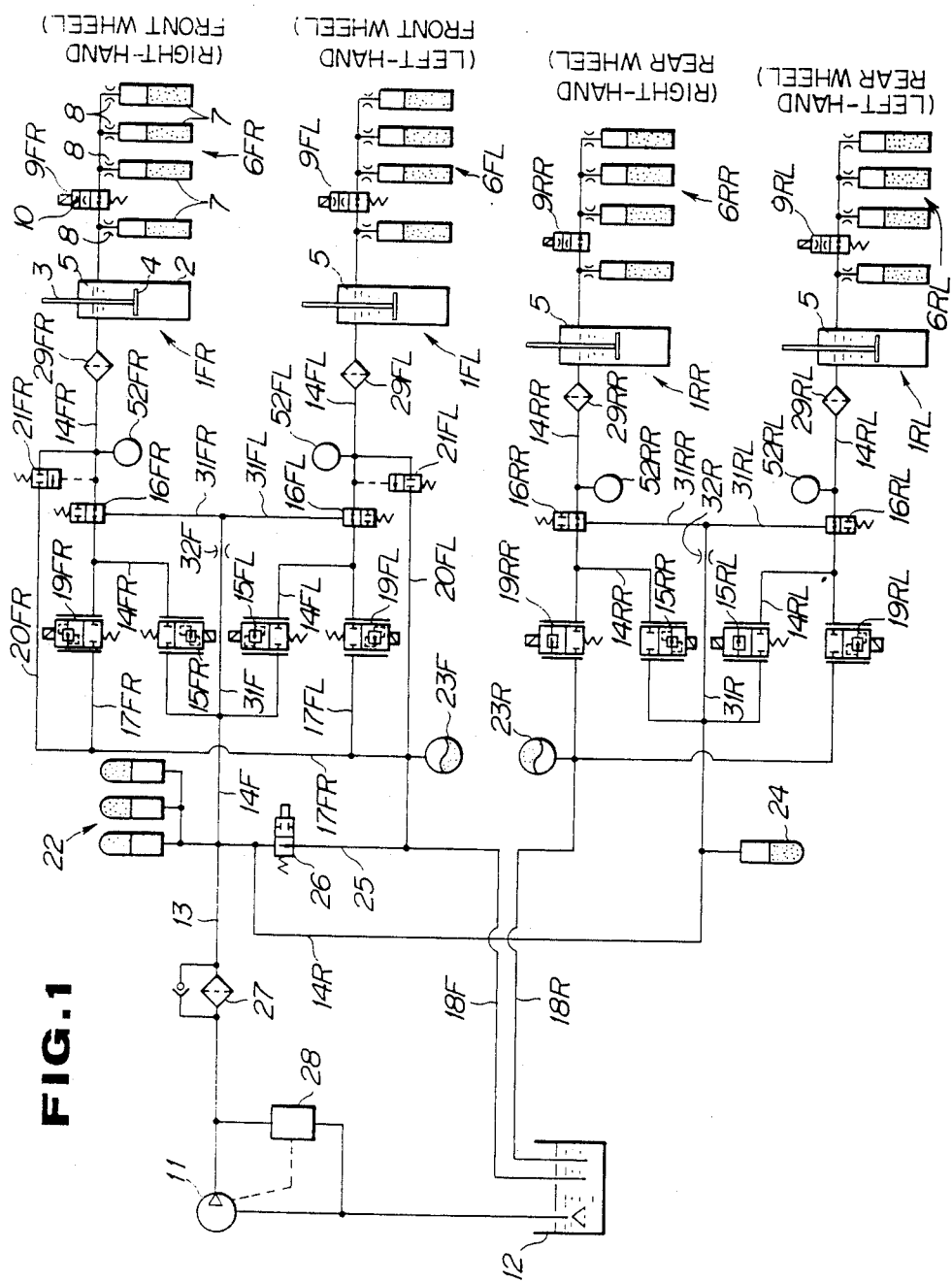
FIG. 1 is a schematic representation showing an operating liquid circuit according to one example of the present invention.

The present invention will be described more in detail by way of examples with reference to the accompanying drawings.

In the following description and the accompanying drawings, reference symbol "F" stands for a front wheel and "R" stands for a rear wheel, as well as reference symbol "FR" stands for a right-hand front wheel, "FL" for a left-hand front wheel, "RR" for a right-hand rear wheel, and "RL" for a left-hand rear wheel. When the front and rear wheels as well as the right-hand and left-hand wheels are not needed to be distinguished, reference numerals are referred to without using these reference symbols.

Operating Liquid Circuit:

As shown in FIG. 1, reference numeral 1 denotes a cylinder unit which is mounted to each of the wheels, a cylinder unit mounted to the right-hand front wheel being referred to as 1FR, a cylinder unit mounted to the left-hand front wheel as 1FL, a cylinder unit mounted to the right-hand rear wheel as 1RR, and a cylinder unit mounted to the left-hand rear wheel as 1RL. Each of these cylinder units comprises a cylinder 2 connected to the unsprung weight and the piston rod 3 extending from the inside of the cylinder 2 and connected to a sprang weight. The cylinder 2 comprises the piston rod 3, a piston 4 integral with the piston rod 3, a liquid chamber 5 disposed upward and defined by the piston 4 and a lower chamber disposed downward of the liquid chamber 5 and communicated therewith. This structure allows the piston rod 3 to extend raising a height of the vehicle body when an operating liquid is fed to the liquid chamber 5 while lowering the height of the vehicle body when the operating liquid is discharged from the liquid chamber 5.

To the liquid chamber 5 of each cylinder unit 1 is connected a gas spring 6 (6FR, 6FL, 6RR, and 6RL) which comprises four cylindrical springs 7 of a small diameter and the four cylindrical springs 7 are arranged in a row and connected to the liquid chamber 5 through orifices 8. Three of the four cylindrical springs 7 are further connected to the liquid chamber 5 through a shift valve 9. This arrangement enables the four cylindrical springs 7 to be communicated with each other only through the orifices 8 when the shift valve 9 is located at a shift position as shown in the drawing, thereby making a damping force smaller at this time. When the shift valve 9 is shifted from the position as shown in the drawing, the three cylindrical springs 7 can be communicated with each other through an orifice 10 incorporated in the shift valve 9, too, thereby making a damping force larger. It is to be noted as a matter of course that a displacement of the shift positions of the shift valve 9 changes spring characteristics of the gas spring 6. Furthermore, it is to be noted that suspension characteristics can also be changed by an amount of the operating liquid to be fed to the liquid chamber 5 of the cylinder unit 1.

Referring to FIG. 1, reference numeral 11 denotes a pump to be driven by the engine, and the pump 11 raises a high-pressure operating liquid from a reservoir tank 12 and discharges the liquid into a common passage 13. The common passage 13 is branched into a forward passage 14F and a rearward passage 14R, the forward passage 14F being further branched into a right-hand forward passage 14FR and a left-hand forward passage 14FL. The right-hand forward passage 14FR is connected to the liquid chamber 5 for the right-hand front wheel cylinder unit 1FR and the left-hand forward passage 14FL is connected to the liquid chamber 5 of the left-hand front wheel cylinder unit 1FL. To the right-hand forward passage 14FR are connected a flow rate control valve 15FR for supplying on the upstream side and a pilot valve 16FR as a delay valve on the downstream side. To the left-hand forward passage 14FL are connected a flow rate control valve 15FL for supplying on the upstream side and a pilot valve 16FL on the downstream side.

To the right-hand forward passage 14FR is connected a first relief passage 17FR for the right-hand forward passage at a position between the valves 15FR and 16FR, and the first relief passage 17FR leads eventually to a reservoir tank 12 through a relief passage 18F for the front wheels. To the first relief passage 17FR is connected a discharge flow rate control valve 19FR. The right-hand forward passage 14FR disposed on the downstream side of the pilot valve 16FR is connected through a second relief passage 20FR to the first relief passage 17FR which is connected to a relief valve 21FR. The right-hand forward passage 14FR is provided with a filter 29FR at a position close to the cylinder unit 1FR. The filter 29FR is disposed at a position among the cylinder unit 1FR, the pilot valve 16FR disposed closer to the cylinder unit 1FR, and the relief valve 21FR, functioning as preventing dust abraded or worn off as a result of abrasion and so on from flowing toward the pilot valve 16FR and the relief valve 21FR.

It is to be noted that the arrangement for passages for the left-hand forward wheel is substantially the same as that for the right-hand forward wheel as have been described hereinabove, so that a duplicate description thereon will be omitted herefrom for a brevity of explanation.

To the common passage 13 is connected a main accumulator 22, and to the front-wheel relief passage 18F is connected an accumulator 23F. The main accumulator 22 serves as a source of accumulating pressures for an operating liquid in association with a sub-accumulator 24, as will be described hereinafter, and it functions as preventing an amount of the operating liquid to be supplied to the cylinder unit 1 from running short. The accumulator 23F prevents a high-pressure operating liquid in the cylinder units 1 for the front wheels from being discharged rapidly to the reservoir tank 12 of a low pressure, namely, prevents a so-called water-hammer phenomenon.

Passages for supplying or discharging operating liquid to or from the cylinder units 1RR and 1RL for the rear wheels are constructed in a way similar to those for the front wheels so that a duplicate description will be omitted from the description which follows. It is to be noted, however, that the passages for the rear wheels are provided with no valves corresponding to the relief valves 21FR and 21FL and that the rear-wheel passage 14R is not provided with the sub-accumulator 24 with the fact taken into account that a length of its rear-wheel passage from the main accumulator 22 becomes longer than that of the front-wheel passage.

The common passage 13, namely, each of the front-wheel passage 14F and the rear-wheel passage 14R, is connected to the front-wheel relief passage 18F through a relief passage 25 to which, in turn, is connected a safety valve 26 consisting of an electromagnetic switch valve.

In FIG. 1, reference numeral 27 stands for a filter and reference numeral 28 for a pressure governing valve for adjusting a discharge pressure from the pump 11 so as to be within a given range. In this embodiment, the pressure governing valve 28 is constituted such that the pump 11 is of a variable-displacement, swash plate type piston that is integrally incorporated into the pump 11. The pressure governing valve 28 can adjust the discharge pressure within the range from 120 to 160 kg/cm$^2$.

The pilot valve 16 is arranged so as to be shifted to open or close in accordance with a differential pressure between the pressures of the front-wheel passage 14F or the rear-wheel passage 14R, namely, the pressure in the common passage 13, and that on the side of the cylinder unit 1. At this end, the pilot valve 16FR for the right-hand front wheel is connected with one of branch passages, 31FR, branched from a common pilot passage 31F leading from the front-wheel passage 14F, while the pilot valve 16FL for the left-hand front wheel is connected with the other of the branch passages, 31FL, branched from the common pilot passage 31F leading therefrom. The common pilot passage 31F is provided with an orifice 32F. A pilot passage for the rear wheels is arranged like the pilot passage 31F for the front wheels.

Figure 2:
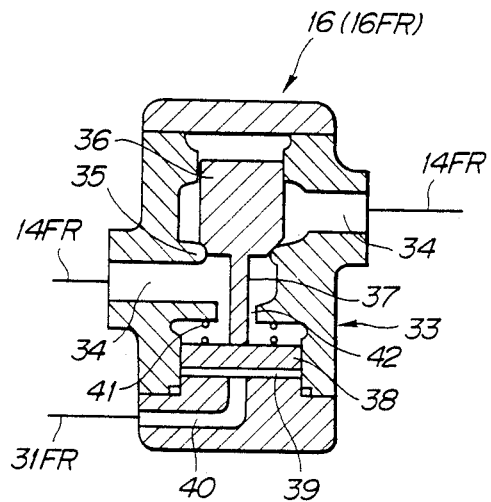
FIG. 2 is a sectional view showing one example of a pilot valve.

Each of the pilot valves 16 may be constructed as shown in FIG. 2. The pilot valve 16 as shown in FIG. 2 is directed to one for the right-hand front wheel, which is provided in a casing 33 with a main flow passage 34 constituting part of the right-hand forward passage 14FR to which the main flow passage 34 is connected. A valve seat 35 is provided at an intermediate position of the main flow passage 34 on or from which a switching piston 36 is seated or separated so as to close or open the piston valve 16FR, the switching piston 36 being slidably inserted into the casing 33.

The switching piston 36 is formed integrally with a control piston 38 through a valve stem 37. The control piston 38 is slidably inserted in the casing 33 and defines a liquid chamber 39 in the casing 33. The liquid chamber 39 is then connected to the branch pilot passage 31FR through a control flow passage 40. The control piston 36 is urged by a return spring 41 in the direction in which the switching piston 36 is being seated on the valve seat 35, in other words, in which the pilot valve 16FR is closed. Furthermore, the control piston 38 is designed such that a pressure of the main flow passage 34 acts upon the control piston 36 through a communication hole 42 on the side opposite to the liquid chamber 39. This arrangement allows the switching piston 36 to be seated on the valve seat 35 to close the pilot valve 16FR as the pressure in the liquid chamber 39 on the side of the common passage 13 has declined to one quarter or less than the pressure in the main flow passage 34 on the side of the cylinder unit 1FR. In this case, when the pressure on the side of the common passage 13 declines to a large extent from a state in which the pilot valve 16FR is open, this decline in the pressure is delayed by means of an action of the orifice 32F and then transmitted to the liquid chamber 39, whereby the pilot valve 16FR is closed in a delayed fashion after the decline in the pressure. It is to be provided that this delay time is set to approximately one second in this embodiment.

Actions of all the valves will be described in more detail hereinafter.

(1) Shift valve 9

The shift valve 9 is operated to shift so as to make a damping force greater only during cornering in this embodiment.

(2) Relief valve 21

The relief valve 21 is being closed under ordinary conditions and opened as the pressure on the side of the cylinder unit 1 reaches a given value or higher. In this embodiment, the given value is set to 160 to 200 kg/cm$^2$. In other words, this valve serves as a safety valve for preventing an abnormal rise in the pressure on the side of the cylinder unit 1.

It is noted that the relief valve 21 may be mounted to the cylinder units 1RR and 1RL for the rear wheels, however, in this embodiment, the relief valve 21 is not mounted on the rear wheels with the fact taken into account that the vehicle body is designed such that the pressure on the side of the rear wheels does not become larger than that on the side of the front wheel on condition that the weight on the front side of the vehicle body is allotted considerably heavier than that on the rear side thereof.

(3) Flow rate control valves 15 and 19

The supply flow rate control valve 15 and the discharge flow rate control valve 19 each are spool valves of electromagnetic type and switched from a closed state to an open state or vice versa. It is provided, however, that there is provided a differential pressure control mechanism so as to make a difference between the pressure on the upstream side and that on the downstream side substantially constant when they are in an open state, because making the differential pressure constant is required for a flow rate control. More specifically, the flow rate control valves 15 and 19 are designed so as to vary with their positions at which their spools displace in proportion to the current to be supplied, namely, with their opening angles, and the current to be supplied are determined on the basis of a map in advance prepared and stored, which represents the relationship of the flow rate with the current. In other words, the current is supplied in correspondence with a flow rate required at that time.

Control of the flow rate control valves 15 and 19 permits a control over a supply or discharge of the operating liquid to or from the cylinder unit 1, thereby resulting in a control over suspension characteristics.

In addition thereto, when an ignition switch is OFF, only a control over lowering a height of the vehicle body is carried out for a given period of time (in this embodiment, the period of time being set to two minutes) from the time when the ignition switch is OFF. In other words, in order to maintain a reference height of the vehicle body, this prevents the vehicle height from becoming partially higher with the fact taken into consideration that the height of the vehicle body varies with changes in load resulting from getting out or for other reasons.

(4) Safety valve 26

The safety valve 26 is closed by excitation at the ordinary time and opened at the fail time. For instance, the fail time may include, for example, when portion of the flow rate control valve 15 or 19 are fixed, when a sensor or other unit, as will be described hereinafter, gets out of order, when the liquid pressure of the operating liquid becomes lost or insufficient, when the pump 11 gets out of order, and so on.

In this embodiment, on top of that, the safety valve 26 is opened in a given period of time, for example, in two minutes, after the ignition switch became OFF.

It is to be noted herein that, when the safety valve 26 is opened, the pilot valve 16 is opened in a delayed fashion, as have been described hereinabove.

(5) Pilot valve 16:

As have been described hereinabove, the pilot valve 16 is opened in a delayed manner due to the action of the orifices 32F and 32R after the pressure in the common passage 13 has been decreased. This arrangement allows closing of the passages 14FR, 14FL, 14RR and 14RL on account of a decrease in the pilot pressure resulting from the opening operation of the safety valve 26 and confining the operating liquid in the cylinder units 1FR, 1RL, 1RR and 1RL, respectively, thereby maintaining the height of the vehicle body. It is noted as a matter of course that suspension characteristics at this time are fixed in a so-called passive fashion.

Figure 3:
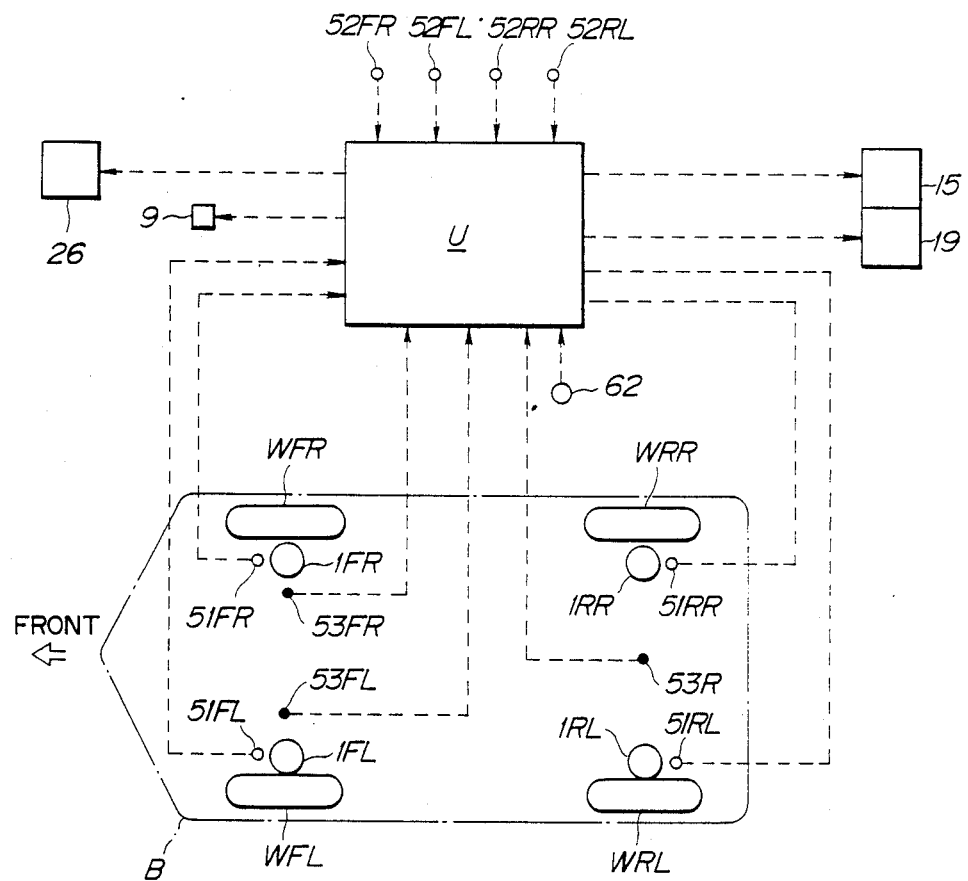
FIG. 3 represents a control system of the circuit of FIG. 1, together with an example of disposition of vertical G sensors.

Control System:

FIG. 3 represents a control system of the operating liquid circuit as shown in FIG. 1. As shown in FIG. 3, reference symbol "WFR" stands for a right-hand front wheel, "WFL" for a left-hand front wheel, "WRR" for a right-hand rear wheel, and "WRL" for a left-hand rear wheel. A vehicle body B is provided with various sensors, respectively, including vehicle-height sensors 51FR, 51FL, 51RR and 51RL which are disposed in each of the cylinder units 1FR, 1FL, 1RR and 1RL for sensing heights of the vehicle body at the positions of the respective wheels, pressure sensing sensors 52FR, 52FL, 52RR, and 52RL for sensing the pressures in the liquid chambers 5 of the respective cylinder units 1FR, 1FL, 1RR and 1RL (see FIG. 1, too), and vertical G sensors 53FR, 53FL, 53RR, and 53RL for sensing vertical acceleration, i.e., acceleration in a vertical direction. Reference symbol "U" stands for a control unit consisting a microcomputer, into which signals are inputted from each of the vehicle-height sensors 51FR, 51FL, 51RR, 51RL, the pressure sensors 52FR, 52FL, 52RR, 52RL, and the vertical G sensors 53FR, 53FL, 53R and which generates its signal to the switch valves 9 (9FR, 9FL, 9RR, 9RL), the supply flow rate control valves 15 (15FR, 15FL, 15RR, 15RL), the discharge flow rate control valves 19 (19FR, 19FL, 19RR, 19RL), and the safety valve 26.

It is provided, however, that FIG. 3 represents two vertical G sensors 53FR and 53FL disposed on the forward side of the vehicle body B as indicated by the dot-and-dash line in FIG. 3 on the axis of the front wheels and at substantially bilaterally symmetrical positions from the central line of the body passing through the gravitational center in the longitudinal direction thereof and one vertical G sensor 53R disposed on the rearward side of the vehicle body B on the axis of the rear wheels and at a substantially halfway position with respect to the central line in the longitudinal direction of the body. The three vertical G sensors are set so as to form a one virtual plane representing the vehicle body B which is an approximately horizontal plane—in other words, so as to be located at substantially the same height.

Figure 4:
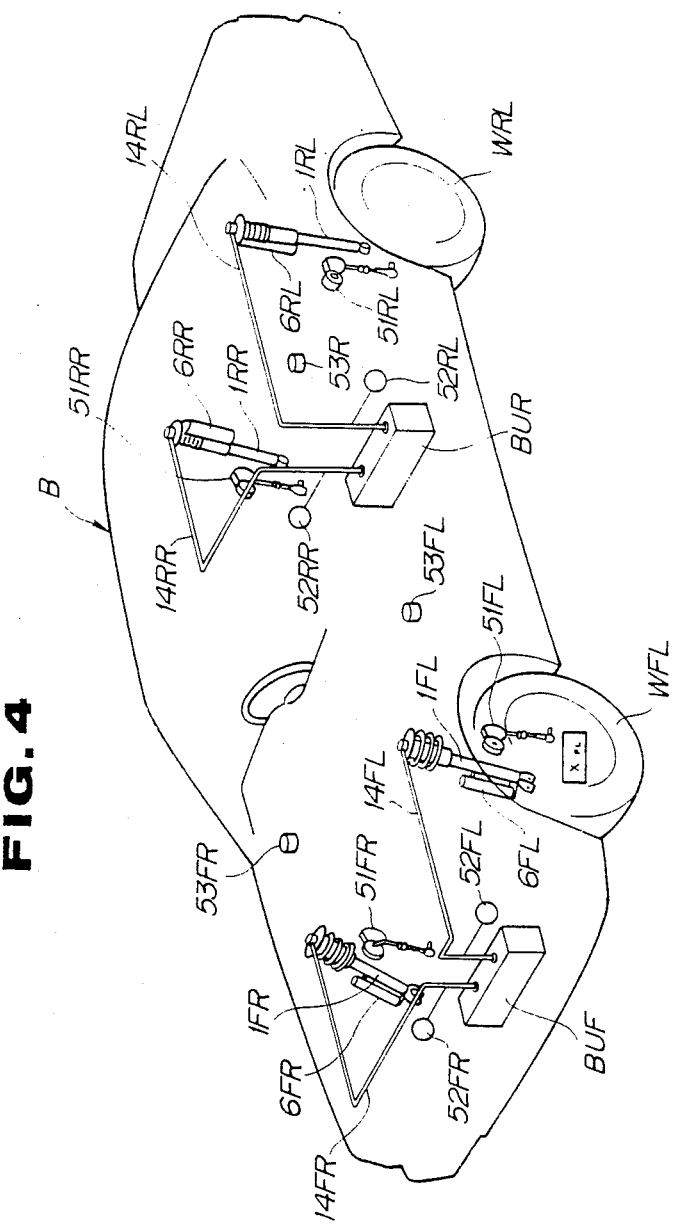
FIG. 4 is a perspective view showing another example of disposition of vertical G sensors.

FIG. 4 shows another example of dispositions of three vertical G sensors 53FR, 53FL, and 53R. As shown in FIG. 4, the two vertical G sensors 53FR and 53FL located at the right-hand and left-hand positions on the front side of the body, on the one hand, are disposed at the right-hand and left-hand end portions of an instrument panel in the vehicle compartment, respectively. The two vertical G sensors 53FR and 53FL are further located at the positions substantially bilaterally symmetrical with respect to the central line of the body in its longitudinal direction. The vertical G sensor 53R, on the other hand, is located in a trunk room formed at a position rearward of a vehicle compartment and is disposed on the rear side of the body and on the substantially central line in the longitudinal direction of the body.

Referring to FIG. 4, reference symbol "BUF" denotes a valve unit in which at least flow rate control valves 15FR, 15FL, 19FR and 19FL for the front wheels are incorporated, and reference symbol "BUR" denotes a valve unit in which at least flow rate control valves 15RR, 15RL, 19RR and 19RL for the rear wheels are incorporated.

Figure 5:
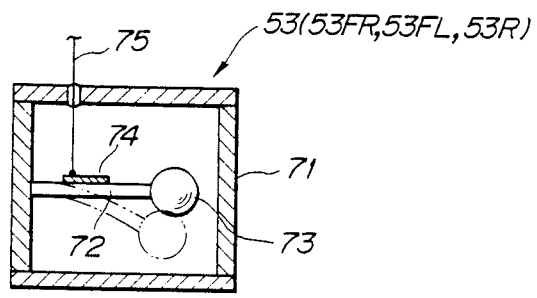
FIG. 5 is a sectional view showing one example of the G sensor.

Turning now to FIG. 5, there is shown a structure of the vertical G sensor 53 (53FR, 53FL, and 53R). The vertical G sensor 53 comprises a casing 71, a beam 72 disposed in the casing 71, and a weight 73. The beam 72 is composed of an elastic member, and one end of the beam 72 is fixed to the casing 71 while the weight 73 is mounted on the other end thereof, or a free end thereof. To the beam 72 is attached a warping gauge 74. The vertical G sensor 53 having the above structure is used in such a manner that the casing 71 is fixed to the body B. This arrangement of the vertical G sensor 53 allows the beam 72 to warp as shown by a dot-and-dash line in FIG. 5 when acceleration in the vertical direction acts upon the body B and an extent of the acceleration in the vertical direction is sensed by means of the warping gauge 74 as a warped amount of the beam 72, then leading the sensed value to the control unit U through a lead wire 75.

Figure 6:
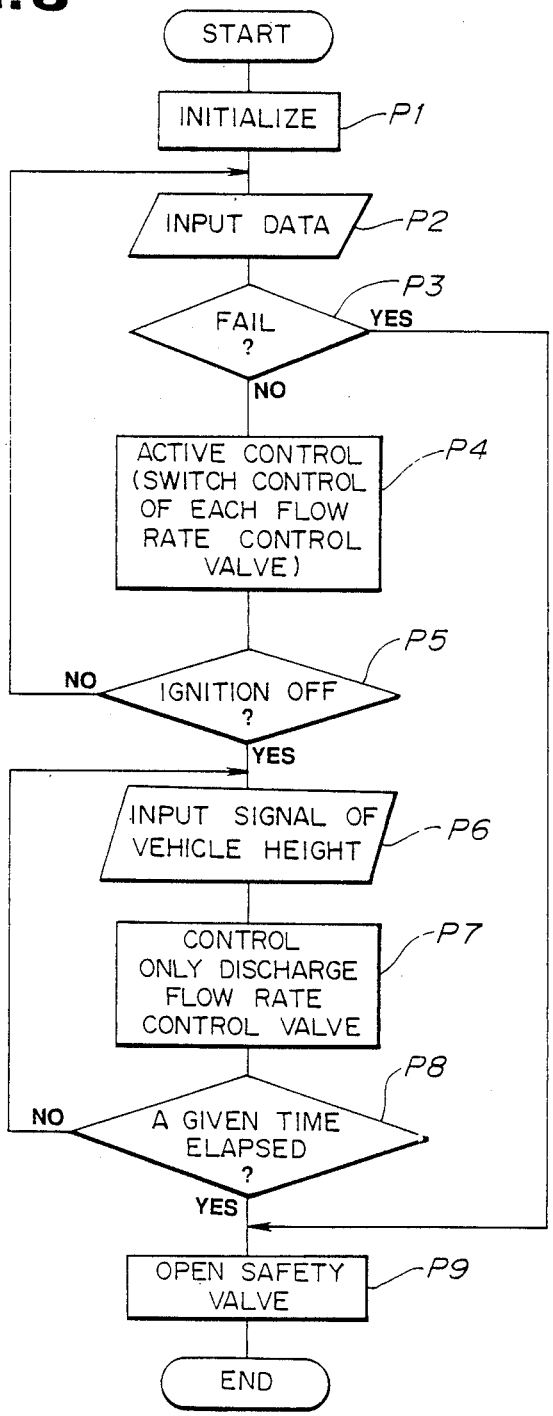
FIG. 6 is a flow chart showing a control example according to the present invention.

The control content of the control unit U will now be described in more detail with reference to the flow chart as shown in FIG. 6. It is provided, however, that a description on the shift valve 9 will be omitted herefrom.

The control system is started as an ignition switch is turned on. First at step P1, the whole system is initialized, in which the safety valve 26 is in a closed state. Then at step P2, signals are inputted from the sensors.

Thereafter, at step P3, it is judged whether or not it is currently at the fail time or not. If it is judged that it is not currently at the fail time, the flow proceeds to step P4 where a so-called active control is carried out by the switching control of each of the flow rate control valves 15 and 19. More specifically, the flow rate control valves 15 and 19 are controlled (active control) so as to make suspension characteristics a desired one - in other words, to make bouncing, pitching, rolling and warping control characteristics of the body a desired control mode, as will be described more in detail hereinafter.

Then at step P5, it is judged whether or not the ignition switch is turned OFF. If NO, then the flow returns to step P2.

When it is judged at step P5 that the ignition switch is turned OFF, a vehicle-height signal is read at step P6 and then only the discharge flow rate control valve 15 is controlled, thereby preventing a height of the vehicle body from becoming partially higher resulting from getting off or the like. Thereafter, at step P8, it allows a given period of time in this embodiment, two minutes, and at step P9, the safety valve 26 is opened. The closing of the pilot valve 16 is delayed from the opening operation of the safety valve 26, thereby ensuring a prevention of a change in heights of the vehicle body thereafter resulting from leakage from the flow rate control valves 15 and 19 or from other causes.

When it is judged at step P3 that it is currently at the fail time, the flow proceeds to step P9 where the safety valve 26 is opened. In order to maintain the height of the vehicle body in such a state that the height of the body is lowered at the fail time, the processing of opening all the flow rate control valves 15 and 19 (in other words, opening at the maximum flow rate) during a delay time from the time when the control valve 26 was opened at step P9 to the time when the pilot valve 16 is closed.

Active Control:

An example of control over the suspension characteristics on the basis of output of each sensor will be described with reference to FIG. 5, and this corresponds to the content of step P4 in FIG. 6.

The control content may be roughly broken down into three control modes, i.e., control over a posture of the vehicle body B on the basis of output from the vehicle-height sensor, control over ride comfortableness on the basis of output from the vertical G sensors, and control over warping of the vehicle body B on the basis of output of the pressure sensor.

(1) Control over Posture (Vehicle-height sensor signal control)

This control comprises control over three postures, namely, a bouncing posture, a pitching posture, and a rolling posture, each of which may be regulated by feedback control by means of PI control.

For the control over the three postures of the body, how to compete with output from each of the vehicle-height sensors is indicated by plus (+) or minus (−) symbols on the left side of each of a bounce control section, a pitch control section, and a roll control section in the drawing. The symbols (+) and (−) indicated on the right side thereof represent control to be carried out by each control section for regulating a change in postures and these symbols are opposite to those provided on the left side of each control section in the drawing.

In other words, for control over a bouncing posture, the PI control is carried out in such a manner that an addition value obtained by adding the heights of the vehicle body on its right-hand and left-hand front wheel sides and an addition value obtained by adding the heights of the body on its right-hand and left-hand rear wheel sides are each brought into agreement with a reference vehicle height. For control over a pitching posture of the body, the PI control is carried out in such a manner that a subtraction value obtained by subtracting the addition value obtained by adding the heights of the body on the right-hand and left-hand rear wheel sides thereof from the addition value obtained by adding the heights of its right-hand and left-hand front wheel sides gives zero. For control over a rolling posture of the body, the PI control is carried out that an addition value obtained by adding the heights of the body on its right-hand front and rear wheel sides is brought into agreement with an addition value obtained by adding the heights of the body on the left-hand front and rear wheel sides thereof.

Each of control values obtained for the three PI control as have been described hereinabove is given for each of the four cylinder units 1 and the control values for each cylinder unit 1 are added and determined as four flow rates $Q_{XFR}$, $Q_{XFL}$, $Q_{XRR}$ and $Q_{XRL}$ for control over the posture of the vehicle body.

(2) Control over ride comfortableness (Vertical G signal control)

This control over ride comfortableness is to prevent impairment of ride comfortableness resulting from the control over posture as have been described in item (1) above. Thus, for this control, the feedback control (in this embodiment, proportional control) is carried out so as to regulate acceleration in the vertical direction for the control over a posture of the body corresponding to three components, including the bouncing component, the pitching component, and the rolling component, as have been described in item (1) above. In this case, it is preferred to set control gains $K_{B3}$, $K_{P3}$ and $K_{R3}$ as values different from each other (for example, $K_{B3} > K_{R3} > K_{P3}$) so as to make them appropriate for the bouncing, pitching, and rolling control modes.

It is noted herein that, as only three vertical G sensors are provided for the control over ride comfortableness in this embodiment, for the pitching control mode, a mean value of addition of the acceleration in the vertical direction on the right-hand and left-hand front body sides is used as acceleration in the vertical direction on the front side.

For the rolling control mode, only the acceleration in the vertical direction on the right-hand and left-hand front side can be used while no acceleration in the vertical direction on the rear side is used.

It is to be understood that, since rolling occurs on the side of the rear wheels after rolling has occurred on the side of the front wheels (as it is common that the front wheels are steered ones), it is preferred to carry out the control over the rolling component on the rear wheel side in a somewhat delayed manner after the control over the rolling component on the front wheel side has been started. In this case, furthermore, a control gain on the side of the front wheels may be changed from that on the side of the rear wheels such that the control gain on the rear wheel side becomes smaller than the control gain n the front wheel side. It is also possible that a time delay and the control gain may be variable in accordance with a running state such as a coefficient of friction on pavement, a steered angle, a velocity of steered angles, a vehicle velocity and so on.

From the standpoint of the fact that rolling on the front wheel side occurs earlier than that on the rear wheel side, it is preferred that a disposition of the two vertical G sensors on the left-hand and right-hand front body side is preferred rather than a disposition of the two vertical G sensors on the left-hand and right-hand rear body side.

In the control over ride comfortableness, too, each of the control values obtained by the above three proportional control is given for each of the four cylinder units 1. Then the control values for each of the cylinder units 1 are added and the four added values are determined eventually as flow rate signals $Q_{GFR}$, $Q_{GFL}$, $Q_{GRR}$ and $Q_{GRL}$ for the respective four controls over ride comfortableness.

Figure 7:
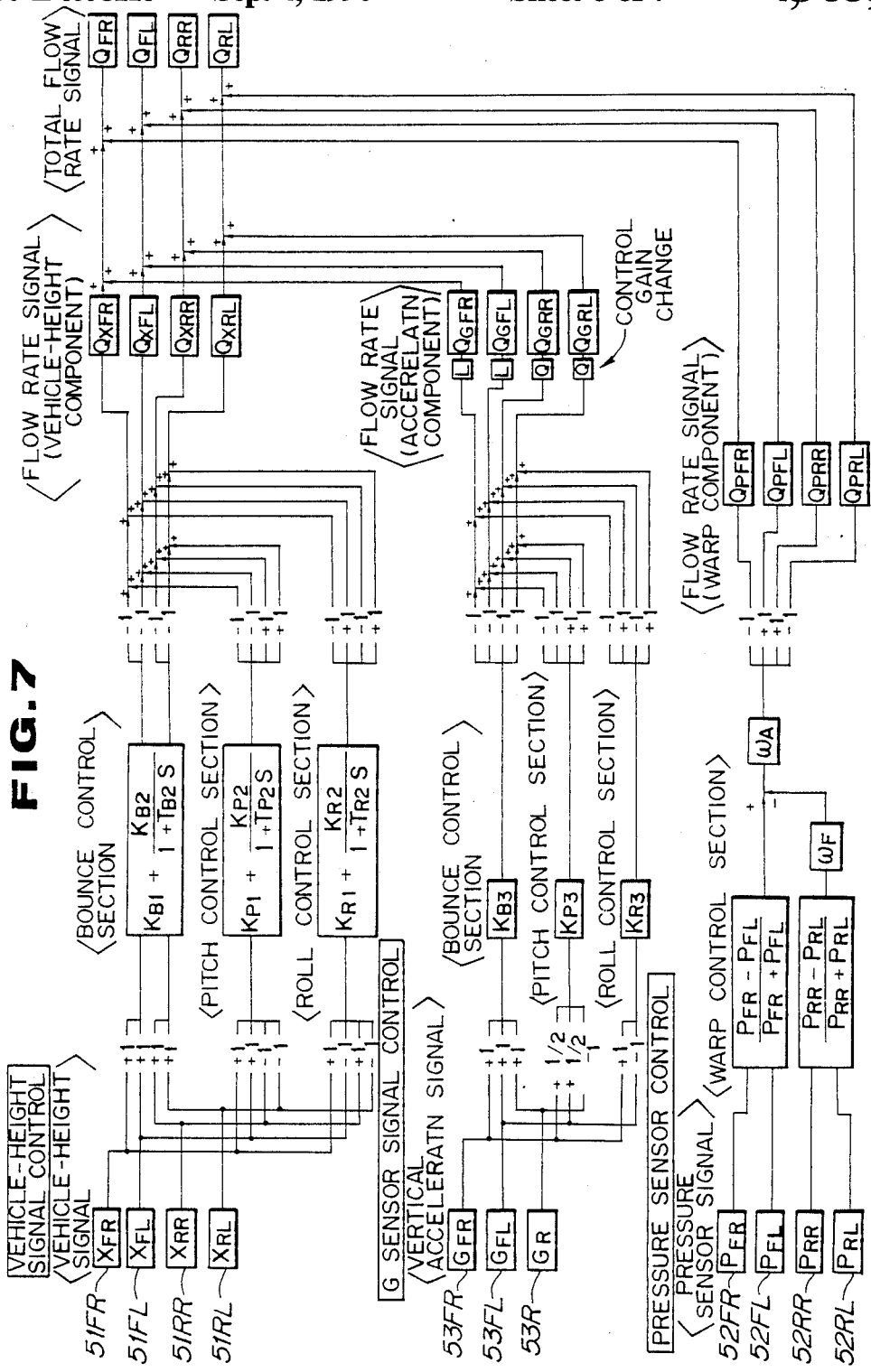
FIG. 7 represents a whole system showing one example for carrying out an active control.

As have been described hereinabove, in the control over ride comfortableness, the control over the rolling component on the rear wheel side is carried out in such a manner as being delayed to some extent after commencement of the control over the rolling component on the front wheel side. Thus, as shown in FIG. 7, flow rate signals utilizing control gains L and Q can be controlled at an initial stage of steering immediately before the flow rate signals QGFR, QGFL, QGRR and QGRL are given. In other words, the control gain L for the front wheels is always set to "1" even if the vehicle is running straight or cornering, while the control gain Q for the rear wheels are usually set to "1" and set to a value smaller than "1" only at an initial stage of cornering, for example, to "0.8" (decreasing the control gain) or "0" (delayed). It is further possible to provide only the flow rate signals for the rear wheels from the roll control section with a delay circuit which can be arranged so as to operate at an initial stage of steering, thereby executing a delay, while to be suspended at the time other than the initial stage of cornering, thereby executing no delay.

Figure 8:
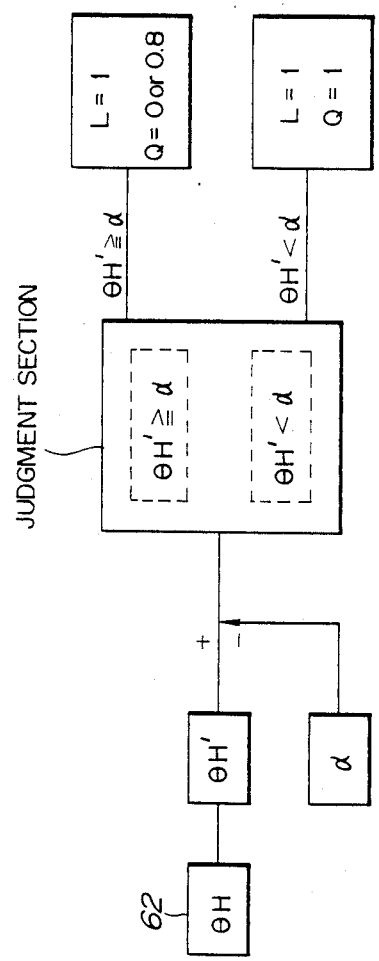
FIG. 8 represents a control system view for determining correction coefficients L and Q for delay.

FIG. 8 shows a block diagram showing a control system for determining the control gains L and Q. As shown in FIG. 8, reference numeral 62 denotes a sensor for sensing a steered angle, $\theta H$, of a steering wheel (see FIG. 3), and a velocity of the steered angle, $\theta_{H'}$, is obtained by differentiating the steered angle $\theta_H$ of the steering wheel. When the velocity of the angle $\theta_{H'}$, is judged by a judgment section to be equal to or larger than a reference value, $\alpha$, on the one hand, the control gain L is set to "1" while the control gain Q is set to "0" (or "0.8"). Furthermore, the delay is executed together with the settings When the velocity of the steered angle, $\theta_{H'}$, is judged by the judgment section to be smaller than the reference value, $\alpha$, on the other hand, the two control gains L and Q are set each to "1" and no delay is executed at this time.

(3) Control over Warping (Pressure signal control)

The control over warping is to control warping of the vehicle body B. In other words, the pressure acting upon each of the cylinder units 1 corresponds to a load applied to each of the wheels so that control over warping of the body B resulting from the load is carried out so as to make the warping unlikely to become larger.

More specifically, this control over warping is carried out basically by implementing feedback control in a direction in which a ratio of a difference between pressures of the right-hand and left-hand front wheels to an addition of the pressures thereof is brought into agreement with a ratio of a difference between pressures of the right-hand and left-hand rear wheels to an addition of the pressures thereof. And a control ratio of a warped amount on the front side of the body to a warped amount on the rear side thereof is determined by correction using a correction coefficient $\omega F$ for determining a control ratio, and a control ratio of the control over postures as described in item (1) above to the control over ride comfortableness as described in item (2) above is given by correction with a correction coefficient $\omega A$. In the control for regulating this warping, the control values are determined eventually as flow rate signals $Q_{PFR}$, $Q_{PFL}$, $Q_{PRR}$ and $Q_{PRL}$ for each of the four cylinder units 1.

Each of the flow rate signals for the control over postures, over ride comfortableness, and over warping for each of the four cylinder units 1 is eventually added to each other and determined as final flow rate signals $Q_{FR}$, $Q_{FL}$, $Q_{RR}$ and $Q_{RL}$ and each of the flow rate control valves 15 and 19 are controlled so as to allow a flow rate to correspond to each of the final flow rate signals $Q_{FR}$, $Q_{FL}$, $Q_{RR}$ and $Q_{RL}$, respectively.

It is to be understood that the foregoing text and drawings relate to embodiments of the invention given by way of examples but not limitation. Various other embodiments and variants are possible within the spirit and scope of the present invention.

What is claimed is:

1. A suspension apparatus of a vehicle, in which each of wheels is provided with an actuator for controlling a height of a vehicle body in accordance with a supply or discharge of an operating fluid and the supply or discharge of the operating fluid to or from the actuator is controlled in accordance with a predetermined condition;

wherein acceleration in a vertical direction acting upon the vehicle body is used as a control parameter for determining a control value for supplying or discharging the operating fluid; and wherein three sensor means for sensing the acceleration in the vertical direction are provided so as to define a virtual plane extending in a substantially horizontal direction.

2. A suspension apparatus as claimed in claim 1, wherein:

two of the three sensor means are disposed on a front portion of the body at positions substantially bilaterally symmetrical with respect to a longitudinally central line of the body; and the rest of the three sensor means is disposed on a rear portion of the body at a position substantially middle in a transverse direction of the body.

3. A suspension apparatus as claimed in claim 2, wherein:

the two sensor means disposed on the front portion of the body are located at respective right-hand and left-hand end portions of an instrument panel; and the one sensor means disposed on the rear portion of the body is located in a trunk room formed at a position rearward of a vehicle compartment.

4. A suspension apparatus as claimed in claim 1, wherein the control value for determining the supply or discharge of the operating fluid to or from the actuator is set to regulate a displacement movement of the body on the basis of output from the three sensor means.

5. A suspension apparatus as claimed in claim 2, wherein:

the displacement movement of the body comprises three component modes consisting of a bouncing component mode, a pitching component mode, and a rolling component mode;

a mode-corresponding control value is determined to regulate the displacement movement of the body for each of the three component modes on the basis of output of at least two sensor means out of the three sensor means; and the control value for determining the supply or discharge of the operating fluid to or from the actuator is determined on the basis of the three mode-corresponding control values.

6. A suspension apparatus as claimed in claim 5, wherein the mode-corresponding control value corresponding to the bouncing component mode is determined on the basis of an addition value of each of output values of the three sensor means.

7. A suspension apparatus as claimed in claim 5, wherein the mode-corresponding control value corresponding to the pitching component mode is determined on the basis of an output value of the one sensor means disposed on the rear portion of the body and a mean value of output values of the two sensor means disposed on the front portion thereof.

8. A suspension apparatus as claimed in claim 5, wherein the mode-corresponding control value corresponding to the rolling component mode is determined on the basis of output values of the two sensor means disposed on the front portion of the body.

9. A suspension apparatus as claimed in claim 5, wherein:

the mode-corresponding control value corresponding on the bouncing component mode is determined on the basis of an addition value of the three sensor means;

the mode-corresponding control value corresponding to the pitching component mode is determined on the basis of an output value of the one sensor means disposed on the rear portion of the body and a mean value of output values of the two sensor means disposed on the front portion thereof;

the mode-corresponding control value corresponding to the rolling component mode is determined on the basis of output values of the two sensor means disposed on the front portion of the body.

10. A suspension apparatus as claimed in claim 9, wherein control over the supply or discharge of the operating fluid to or from the actuator on the rear wheel side is delayed from control over the supply or discharge of the operating fluid to or from the actuator on the front wheel side at an initial stage of steering.

11. A suspension apparatus as claimed in claim 9, wherein a control gain for determining the control value for determining the supply or discharge of the operating fluid to or from the actuator on the rear wheel side is made smaller than a control gain for determining the control value for the supply or discharge of the operating fluid to or from the actuator on the front wheel side at an initial stage of steering.

12. A suspension apparatus as claimed in claim 1, wherein:

the actuator is a cylinder unit interposed between a sprang weight and an unsprung weight; and the operating fluid is a liquid, or an incompressible fluid.

13. A suspension apparatus as claimed in claim 12, wherein:

the supply or discharge of the operating fluid to or from the cylinder unit is carried out by means of a flow rate control valve; and the control value for carrying out the supply or discharge of the operating fluid to or from the cylinder unit is set as a flow rate signal to the flow rate control valve.

14. A suspension apparatus as claimed in claim 13, wherein:
two of the three sensor means are disposed on a front portion of the body at positions substantially bilaterally symmetrical with respect to a longitudinally central line of the body; and
the rest of the three sensor means is disposed on a rear portion of the body at a position substantially middle in a transverse direction of the body.

15. A suspension apparatus as claimed in claim 14, wherein:
the two sensor means disposed on the front portion of the body are located at respective right-hand and left-hand end portions of an instrument panel; and
the one sensor means disposed on the rear portion of the body is located in a trunk room formed at a position rearward of a vehicle compartment.

16. A suspension apparatus as claimed in claim 14, wherein the control value for the flow rate valve is set to regulate a displacement movement of the body on the basis of output from the three sensor means.

17. A suspension apparatus as claimed in claim 16, wherein:
the displacement movement of the body comprises three component modes consisting of a bouncing component mode, a pitching component mode, and a rolling component mode;
a mode-corresponding control value is determined to regulate the displacement movement of the body for each of the three component modes on the basis of output of at least two sensor means out of the three sensor means; and
the control value for the flow rate control valve is determined on the basis of the three mode-corresponding control values.

18. A suspension apparatus as claimed in claim 17, wherein the mode-corresponding control value corresponding to the bouncing component mode is determined on the basis of an addition value obtained by adding each of output values of the three sensor means.

19. A suspension apparatus as claimed in claim 17, wherein the mode-corresponding control value corresponding to the pitching component mode is determined on the basis of an output value of the one sensor means disposed on the rear portion of the body and a mean value of output values of the two sensor means disposed on the front portion thereof.

20. A suspension apparatus as claimed in claim 17, wherein the mode-corresponding control value corresponding to the rolling component mode is determined on the basis of output values of the two sensor means disposed on the front portion of the body.

21. A suspension apparatus as claimed in claim 17, wherein:
the mode-corresponding control value corresponding to the bouncing component mode is determined on the basis of an addition value obtained by adding the three sensor means;
the mode-corresponding control value corresponding to the pitching component mode is determined on the basis of an output value of the one sensor means disposed on the rear portion of the body and a mean value of output values of the two sensor means disposed on the front portion thereof;
the mode-corresponding control value corresponding to the rolling component mode is determined on the basis of output values of the two sensor means disposed on the front portion of the body.

22. A suspension apparatus as claimed in claim 21, wherein the addition value of the three sensor means is determined as a control value for the flow rate control valve.

23. A suspension apparatus as claimed in claim 21, wherein a determination of the control value for the flow rate control valve for the cylinder unit on the rear wheel portion is delayed from a determination of the control value for the flow rate control valve for the cylinder unit on the front wheel portion at an initial stage of steering.

24. A suspension apparatus as claimed in claim 21, wherein a control gain for determining the control value for determining the control value for the flow rate control valve for the cylinder unit on the rear wheel side is made smaller than a control gain for determining the control value for the flow rate valve for the cylinder unit on the front wheel side at an initial stage of steering.

25. A suspension apparatus as claimed in claim 13, wherein a gas spring is connected to the cylinder unit.

26. A suspension apparatus comprising:
a cylinder unit interposed between an unsprung weight and a sprang weight for each of wheels for controlling a height of a vehicle body in accordance with a supply or discharge of an operating fluid comprising an incompressible fluid;
a flow rate control valve for independently controlling a flow rate for supplying or discharging the operating fluid to or from the cylinder unit;
vehicle-height detecting means associated with each of the wheels for detecting a height of the vehicle body;
first control means for controlling the flow rate control valve in response to output from the vehicle-height detecting means so as to allow a posture of the body corresponding to three component modes including a bouncing component mode, a pitching component mode and a rolling component mode to take a posture satisfying a predetermined condition;
sensor means for detecting acceleration in a vertical direction acting upon the body; and
second control means for controlling the flow rate control valve to regulate a displacement movement of the body in response to output from the sensor means;
wherein the sensor means comprises three sensor means, two of which are disposed on a front portion of the body at positions substantially bilaterally symmetrical with respect to a longitudinally central line of the body; and the rest of which is disposed on a rear portion of the body at a position substantially middle in a transverse direction of the body, the three sensor means defining a virtual plane representing the body; and
wherein the second control means determines a mode-corresponding control value corresponding to each of the modes so as to regulate the displacement movement of the body corresponding to the three component modes of the posture of the body including the bouncing component mode, the pitching component mode and the rolling component mode and determines a control value for the flow rate control valve on the basis of the mode-corresponding control value.

27. A suspension apparatus as claimed in claim 26, wherein an addition value of a control value by means of the first control means and a control value by means of the second control means is set as a final control value for the flow rate control valve.

28. A suspension apparatus as claimed in claim 26, wherein:
the mode-corresponding control value corresponding to the bouncing component mode is determined on the basis of an addition value obtained by addition of output values of the three sensor means;
the mode-corresponding control value corresponding to the pitching component mode is determined on the basis of an output value of the one sensor means disposed on the rear portion of the body and a mean value of output values of the two sensor means disposed on the front portion thereof;
the mode-corresponding control value corresponding to the rolling component mode is determined on the basis of output values of the two sensor means disposed on the front portion of the body; and
an addition value of the three mode-corresponding control values is determined as the control value by means of the second control means.

29. A suspension apparatus as claimed in claim 26, wherein the first control means comprises:
first mode-corresponding control value determining means for determining a mode-corresponding control value corresponding to the bouncing component mode so as to bring each of an addition value of output values of the two vehicle-height detecting means disposed on the right-hand and left-hand front wheels and an addition value of output values of the two vehicle-height detecting means disposed on the right-hand and left-hand rear wheels into agreement with a reference value;
second mode-corresponding control value determining means for determining a mode-corresponding control value corresponding to the pitching component mode so as to make a deviation between an addition value of output values of two vehicle-height detecting means for left-hand and right-hand front wheels and an addition value of output values of two vehicle-height detecting means for left-hand and right-hand rear wheels zero; and
third mode-corresponding control value determining means for determining a mode-corresponding control value corresponding to the rolling component mode so as to bring an addition value of output values of two vehicle-height detecting means for left-hand front and rear wheels into agreement with an addition value of output values of two vehicle-height detecting means for right-hand front and rear wheels;
wherein an addition value obtained by adding the mode-corresponding control values determined by the first, second and third mode-corresponding control value determining means is determined as a control value for the flow rate control value by means of the first control means.

30. A suspension apparatus as claimed in claim 26, wherein the first control means comprises:
first mode-corresponding control value determining means for determining a mode-corresponding control value corresponding to the bouncing component mode so as to bring each of an addition value of output values of the two vehicle-height detecting means disposed on the right-hand and left-hand front wheels and an addition value of output values of the two vehicle-height detecting means disposed on the right-hand and left-hand rear wheels into agreement with a reference value;
second mode-corresponding control value determining means for determining a mode-corresponding control value corresponding to the pitching component mode so as to make a deviation between an addition value of output values of two vehicle-height detecting means for left-hand and right-hand front wheels and an addition value of output values of two vehicle-height detecting means for left-hand and right-hand rear wheels zero; and
third mode-corresponding control value determining means for determining a mode-corresponding control value corresponding to the rolling component mode so as to bring an addition value of output values of two vehicle-height detecting means for left-hand front and rear wheels into agreement with an addition value of output values of two vehicle-height detecting means for right-hand front and rear wheels;
wherein an addition value obtained by addition of the mode-corresponding control values determined by the first, second and third mode-corresponding control value determining means is determined as a control value for the flow rate control value by means of the first control means;
wherein the second control means comprises:
fourth mode-corresponding control value determining means for determining a mode-corresponding control value corresponding to the bouncing component mode on the basis of an addition value of output values of the three sensor means;
fifth mode-corresponding control value determining means for determining the mode-corresponding control value corresponding to the pitching component mode on the basis of an output value of one sensor means disposed on the rear portion of the body and a mean value of output values of two sensor means disposed on a front portion thereof; and sixth mode-corresponding control value determining means for determining the mode-corresponding control value corresponding to the rolling component mode on the basis of output values of two sensor means disposed on the front portion of the body;
wherein an addition value obtained by addition of the mode-corresponding control values determined by the fourth, fifth and sixth mode-corresponding control value determining means is determined as a control value for the flow rate control value by means of the second control means; and
wherein an addition value obtained by addition of the control value of the first control means and the control value of the second control means is determined as a control to be generated to the flow rate control valve.

31. A suspension apparatus as claimed in claim 27, further comprising:
a pressure detecting means disposed each on the cylinder unit for detecting a pressure in the cylinder unit; and
third control means for controlling the flow rate control valve in response to output from the pressure detecting means so as to regulate an action of a warping force between the front and rear portions of the body;

wherein an addition value obtained by addition of the control values by the first, second and third control means is determined as the control value for the flow rate control valve.

32. A suspension apparatus as claimed in claim 31, wherein the third control means comprises:

a first ratio determining means for determining a ratio of an addition value to a subtraction value of output values of two pressure detecting means for the cylinder units for the right-hand and left-hand wheels; and a second ratio determining means for determining a ratio of an addition value and a subtraction value of output values of two pressure detecting means for the cylinder units for the right-hand and left-hand rear wheels;

wherein a control value for the third control means is determined so as to regulate a difference between the ratio determined by the first ratio determining means and the ratio determined by the second ratio determining means.

33. A suspension apparatus as claimed in claim 26, wherein a gas spring is connected to the cylinder unit.

* * * * *